(12) United States Patent
Östling et al.

(10) Patent No.: US 7,070,332 B2
(45) Date of Patent: Jul. 4, 2006

(54) COMBINATION OF BEARING HOUSING AND LOAD MEASURING PLATE

(75) Inventors: Sture Östling, Katrineholm (SE); Leif Richardsson, Katrineholm (SE); Peter Johansson, Göteborg (SE)

(73) Assignee: Aktiebolaget SKF, Gothenburg (SE)

( * ) Notice: Subject to any disclaimer, the term of this patent is extended or adjusted under 35 U.S.C. 154(b) by 49 days.

(21) Appl. No.: 10/975,992

(22) Filed: Oct. 29, 2004

(65) Prior Publication Data

US 2005/0147337 A1    Jul. 7, 2005

(30) Foreign Application Priority Data

Oct. 29, 2003    (SE) .................................... 0302855

(51) Int. Cl.
*F16C 19/00*    (2006.01)
(52) U.S. Cl. ...................... 384/448; 384/428
(58) Field of Classification Search ................ 384/537, 384/584, 448, 428
See application file for complete search history.

(56) References Cited

U.S. PATENT DOCUMENTS

| 5,186,061 A | 2/1993 | Montalvo et al. |
| 6,360,596 B1 | 3/2002 | Callendrier |
| 6,648,516 B1 | 11/2003 | Eriksson et al. |

FOREIGN PATENT DOCUMENTS

SE    518 218 C2    9/2002

*Primary Examiner*—Lenard A. Footland
(74) *Attorney, Agent, or Firm*—Buchanan Ingersoll PC

(57) ABSTRACT

The combination of a bearing housing and a load measuring plate includes a bearing housing having a foot member possessing a substantially rectangular outer contour, with outer wall portions and transverse intermediate wall portions forming a planar overall contact surface to be in contact with and resting upon a load measuring plate. The load measuring plate is internally equipped with load measuring devices. The outer contour of the load measuring plate is closely adapted to the outer contour of the foot member of the bearing housing.

17 Claims, 2 Drawing Sheets

COMBINATION OF BEARING HOUSING AND LOAD MEASURING PLATE

This application is based on and claims priority under 35 U.S.C. § 119 with respect to Swedish Application No. 0302855-2 filed on Oct. 29, 2003, the entire content of which is incorporated herein by reference.

FIELD OF THE INVENTION

The present invention generally relates to a combination of a bearing housing and a load measuring plate. More particularly, the invention pertains to the combination of a bearing housing and a load measuring plate of the type designed as a plate or block positioned between a base and a bearing housing, the load upon which shall be measured. The measuring plate can have a parallelepipedic structure, and can be armed with transducers producing measurement signals as a result of changes in magnetic fields. Such transducers can, for example, be strain gauges arranged in Wheatstone bridges for measuring the load acting thereon.

BACKGROUND DISCUSSION

A known load measuring block generally of the type referred to above is armed with Pressductor® transducers manufactured and marketed by ABB AB. These transducers operate with a measurement principle based on the magnetoelastic effect in which the magnetic properties of a material are influenced by the mechanical force applied to it.

There are a number of load cell configurations and several standard sizes, which are used primarily for roll force measurement in rolling mills, such as circular for installation under the mill screws or hydraulic actuators, rectangular for installation under the lower backup roll chock or annular for installation between the mill stand and nut.

Earlier, such load cells have also been used for measuring the load applied under operation to bearings supporting a shaft. It has been considered sufficient just to place the load cell or plate under the foot of the bearing housing. A load cell has thus been chosen, preferably of rectangular configuration and of a size big enough to allow the foot of the bearing housing to be positioned well inside the outer edges of the load cell.

With bearing housings having a substantially planar outer contour, it has been believed that this combination of a bearing housing foot resting well inside the edges of a load measuring plate, which has a bigger planar contact area against the base than the contact area between load measuring plate and the bearing housing, will give a satisfactory measuring result.

However, in modern bearing technology, the bearing housings have often been designed with a foot member, which has a number of recesses or cavities opening in a direction away from the bearing seat, i.e. downwards. This design reduces the weight of the bearing housing. In addition, though, the almost shell-like outer contour of the foot part of the bearing housing has become weakened. There is thus a risk for deformation under influence of high loads, and for that reason the outer walls of the bearing housing foot have been made more stiff by providing reinforcing transverse intermediate walls.

This design means that the earlier used combination of standard load measuring plates and a bearing housing, which has outer contours smaller than that of the load measuring plate, will give a non-secure and unsatisfactory measuring result, as the wall portions of the bearing housing foot contacting the surface of the load measuring plate will be randomly distributed over the load measuring plate, with a measurement result which might be incorrect.

SUMMARY

According to one aspect, the combination of a bearing housing and a load measuring plate comprises a load measuring plate internally equipped with load measuring devices, and a bearing housing comprising a foot member possessing a substantially rectangular outer contour that includes outer wall portions, transverse intermediate wall portions and a planar contact surface adapted to contact and rest upon the load measuring plate. The load measuring plate possesses an outer contour substantially the same as the outer contour of the foot member. The load measuring plate possesses an upper surface and a lower surface, with the upper surface configured to include raised upper end portions projecting above at least a portion of the upper surface located between the raised upper end portions, and with the lower surface configured to include lower end portions positioned above at least a portion of the lower surface located between the raised lower end portions. The raised upper end portions extend from the outer edge of the load measuring plate by a distance less than the distance over which the lower end portions extend from the outer edge of the load measuring plate, thereby creating oblique measurement planes in the load measuring plate.

According to another aspect, a bearing housing and load measuring plate combination comprises a load measuring plate provided with at least one load measuring device, and a bearing housing adapted to rest on a base and comprising a foot member possessing outer wall portions, transverse intermediate wall portions and a planar contact surface adapted to contact and rest upon the load measuring plate. The load measuring plate possesses an outer contour that is substantially the same as the outer contour of the foot member. The load measuring plate also possesses an upper surface and a lower surface, with the upper surface having upper end portions positioned in a plane that is offset from a central portion of the upper surface of the load measuring plate, and with the lower surface having lower end portions positioned in a plane that is offset relative to a central portion of the lower surface of the load measuring plate. The foot member of the bearing housing rests on the upper end portions of the load measuring plate, and a lower central portion of the lower surface is adapted to rest on the base with the lower end portions of the lower surface spaced from the base.

BRIEF DESCRIPTION OF THE DRAWING FIGURES

The foregoing and additional details will become more apparent from the following detailed description considered with reference to the accompanying drawing figures in which like elements are designated by like reference numerals.

DETAILED DESCRIPTION

Figure 1:
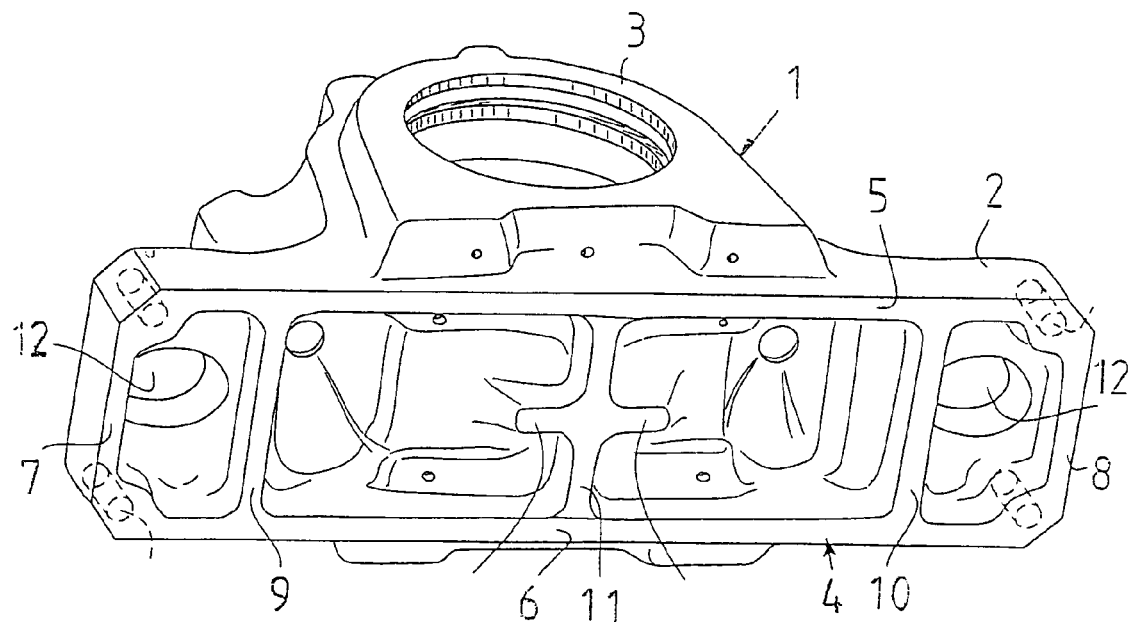
FIG. 1 is a perspective view a bearing housing of a type used in the combination according the invention as viewed obliquely from the bottom or foot side thereof.

FIG. 1 shows a bearing housing 1 in perspective view, as seen obliquely from the bottom of the foot member 2, with a tubular main portion 3 facing away from the viewer. The bottom surface of the foot member 2 has a substantially rectangular outer contour 4, although the four corners thereof are bevelled. As can be seen, the foot member 2 is substantially or generally shell-formed and has two parallel, thin outer long-side walls 5, 6 and two parallel thin short-side walls 7, 8 interconnecting the long-side walls 5, 6. Several transverse wall portions 9, 10, 11 extend between the tubular main body 3 and the long-side walls 5, 6 to reinforce the housing base. In the embodiment shown, one of these transverse wall portions 11 is positioned just under the center of the tubular main portion, whereas the other two transverse wall portions 9, 10 are situated a short distance from the adjacent short-side walls. These transverse wall portions 9, 10, 11 are positioned substantially reducing the weight of the bearing housing. The tubular main portion 3, which has an inner, substantially cylindrical seat for accommodating the outer ring of a bearing, is spaced apart from the bottom surface of the foot member 2, thereby leaving spaces opening downwards.

Due to this design of the bottom of the foot member 2, the load on the bearing housing will be transferred to the surface on which it is positioned, only via the side walls 5, 6, 7, 8 and the transverse walls 9, 10, 11 which, in the illustrated embodiment, are relatively thin. The areas between these walls 5–11 inside the outer contour of the foot member will not participate in any transfer of the load. The end sections outside the transverse reinforcing walls 9, 10 are provided with through-holes 12 for attachment bolts, by which the bearing housing can be fitted to a base.

With the earlier load measuring blocks, for example, of the Pressductor® transducer type, where the contact surface of a bearing housing foot member of the type described is limited, there will be a random coincidence between the load transferring areas of the bearing housing and the load receiving areas of these earlier load measuring blocks. This means that the result of the measurement will be very much dependent on the mutual positioning of the two components in relation to each other.

Figure 2:
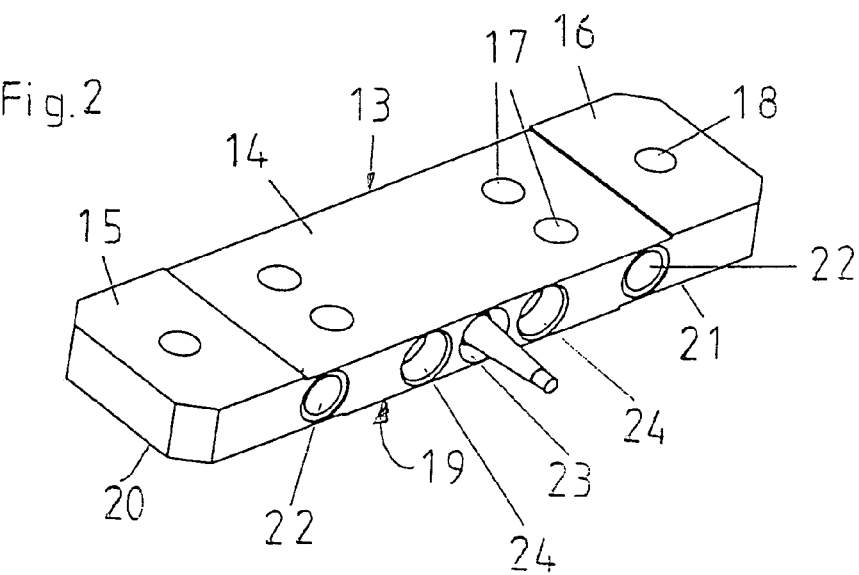
FIG. 2 is a perspective view of a load measuring plate used in combination with the bearing housing shown in FIG. 1.

FIG. 2 shows in a perspective view a load measuring plate 13 adapted to the bearing housing foot member of the type shown in FIG. 1 and described above. As can be seen, this load measuring plate 13 has a substantially parallelepipedic shape with an outer contour closely adapted to, and preferably the same as, the outer contour of the foot member 4 of the bearing housing 1. Thus, the size and the shape of the load measuring plate 13 is closely adapted to, and preferably the same as, that of the bearing housing foot member.

Thus, the upper surface 14 of the load measuring plate 13 has a size and shape carefully corresponding to the size and shape of the foot member of the bearing housing, which foot member 2 is positioned on the surface 14 of the load measuring plate 13. As can be clearly seen in FIG. 2, the load measuring plate 13 has also the same bevelled side corners as the bearing housing foot member.

The upper side surface 14 of the load measuring plate 13 is not completely planar, but rather has raised or offset upper end portions 15, 16. The upper end portions 15, 16 are offset relative to at least a portion of the central portion of the plate 13 located between the end portions 15, 16. With this configuration, the foot member 4 of the bearing housing 1 will rest on the load measuring plate 13 only at these raised upper end portions 15, 16 of the load measuring plate 13. The portion of the load measuring plate 13 situated between these raised upper end portions 15, 16 has a number of through holes 17 for coupling members, for example, bolts, for attaching the load measuring plate 13 to a base. In addition, each of the offset end portions 15, 16 has one through-hole 18. These through-holes 18 are intended to receive bolts which will also pass through the through-openings 12 in the bearing housing foot member 2, and thereby attach the bearing housing 1 to the load measuring plate 13.

Figure 4:
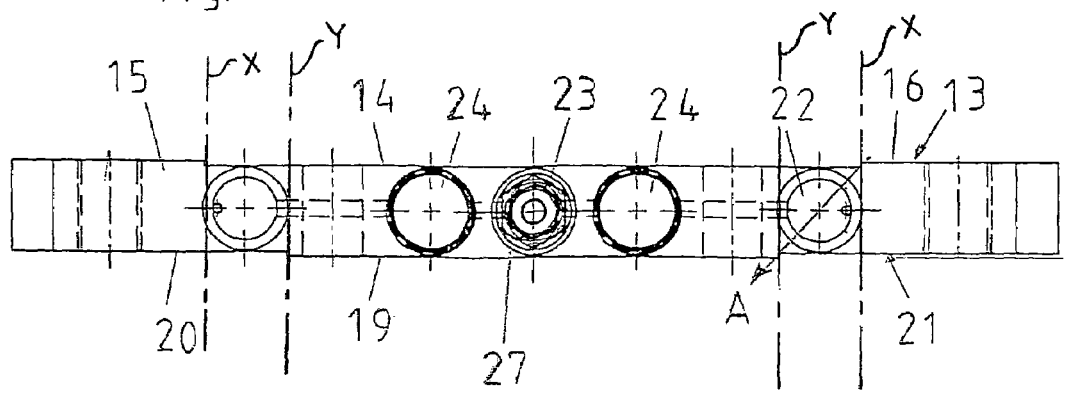
FIG. 4 is a side view of the load measuring plate with certain hidden portions shown in phantom lines.

As best seen in FIG. 4, the lower side surface 19 of the load measuring plate 13 has a shape which is also not completely planar, but rather has lower end portions 20, 21 which are slightly raised above and offset relative to at least a portion of the lower surface positioned between the lower end portions 20, 21. Thus, at the upper and lower surfaces 14, 19 of the load measuring plate 13, the end portions lie in a plane that is offset from the plane containing the central portion of the respective surfaces. The length of the lower end portions 20, 21 in the lengthwise direction of the plate 13 (i.e., left-to-right direction in FIG. 4) is greater than that of the upper end portions 15, 16. Thus, the load by which the bearing housing will act upon the load measuring plate 13 will act as forces attacking or acting upon the upper end portions 15, 16, with such load being transferred to strain acting in the direction of the arrow A (oblique measurement plane) shown in FIG. 4.

The load measuring plate 13 is also provided with a plurality of chambers 22. In the disclosed embodiment, these chambers 22 extend substantially parallel to the upper and lower surfaces 14, 19 and are located at a position between the upper and lower surfaces 14, 19. In the illustrated embodiment, the load measuring plate 13 is provided with a pair of chambers 22. The respective chambers 22 are located in the areas between each of the raised upper end portions 15, 16 and their associated raised lower end portions 20, 21, respectively, as shown in FIG. 2. Each of the chambers 22 also extends substantially perpendicular to the longitudinal direction of the load measuring plate. Additional characteristics pertaining to the configuration and function of the chamber 22 will be described below with reference to FIG. 3

The load measuring plate 13 has at least one additional opening or chamber. In the illustrated embodiment, the load measuring plate 23 is provided with three such additional chambers or openings 23, 24, which also will be further described below in connection with FIG. 3.

Figure 3:
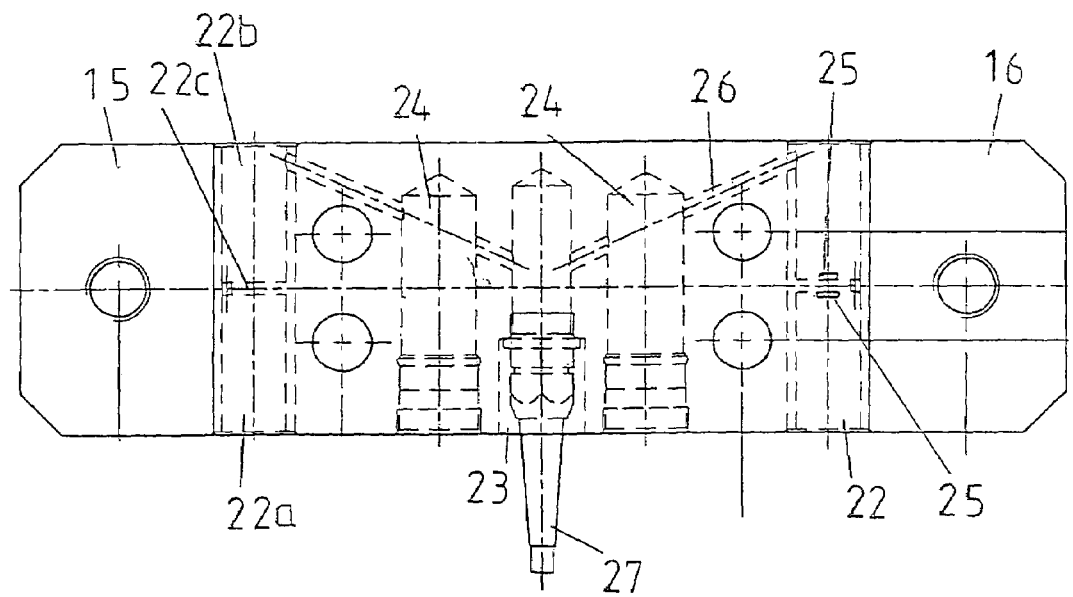
FIG. 3 is a plan view from above of the load measuring plate with certain hidden portions shown in phantom lines.

Referring to FIG. 3, each one of the chambers 22 is comprised of two bottom holes or blind holes 22a, 22b separated by an intermediate wall 22c. The intermediate wall 22c is positioned in the measurement plane A. On each side of these intermediate walls is attached a load measurement device which can be in the form of a strain measurement device schematically shown at 25. These strain measurement devices can, for instance, be designed as strain gauges arranged in the form of a Wheatstone bridge.

The additional chambers 23, 24 are made as bottom or blind holes extending into the plate. These additional chambers 23, 24 communicate with the chambers 22 via channels 26. These channels 26 are intended to contain conduits arranged to feed electric power to the strain measurement devices 25 and to transfer signals representative of the current measurement to output cables. The electric power can be supplied via a socket 27 positioned in the additional chamber 23. The conduits arranged in the additional chambers 24 can lead the output signals to an external signal processor and/or recorder. Alternatively, both power supply and measurement signals can be arranged via only one chamber 23.

FIG. 4 is a side view of the load measuring plate 13 and illustrates how the upper end portions 15, 16 and the lower end portions 20, 21 are displaced (in the direction of the plane of the plate 13) so much from each other that there will be a resulting bending force applied to the area where the strain measurement devices are positioned in the chambers 22, thereby ensuring that the strain caused by the current load exerted by the bearing housing on the load measuring plate is positively applied in the positions of the load measuring devices.

Thus, the length of the raised or offset upper end portions 15, 16 in the lengthwise longitudinal direction of the plate 13 (i.e., the left-to-right direction of the plate 13) is less than the length of the raised or offset lower end portions 20, 21. In addition, each of the chambers 22 is generally located at least partially between two vertical planes, namely one plane X located generally at the transition between the raised or offset upper end portion 15, 16 and the adjoining upper central portion, and the other plane Y located generally at the transition between the offset lower end portion 20, 21 and the adjoining lower central portion. As discussed above, the load measuring plate 13 is adapted to rest on a base. With the configuration of the load measuring plate and bearing housing described above, the foot member 2 of the bearing housing rests on the upper end portions 15, 16 of the load measuring plate 13, and the lower central portion of the lower surface of the load measuring plate rests on the base with the lower end portions 20, 21 of the lower surface spaced from the base.

The bearing housing and load measuring plate combination described above produces a reliable and secure measurement result independent of the positioning of the outer walls and reinforcing intermediate walls of the bearing housing foot member.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A combination of a bearing housing and a load measuring plate comprising:
    a load measuring plate internally equipped with load measuring devices;
    a bearing housing comprising a foot member possessing a substantially rectangular outer contour that includes outer wall portions, transverse intermediate wall portions and a planar contact surface adapted to contact and rest upon the load measuring plate;
    the load measuring plate possessing an outer contour substantially the same as an outer contour of the foot member;
    the load measuring plate possessing an upper surface and a lower surface, with the upper surface configured to include raised upper end portions projecting above at least a portion of the upper surface located between the raised upper end portions, and with the lower surface configured to include lower end portions positioned above at least a portion of the lower surface located between the raised lower end portions;
    the raised upper end portions extending from an outer edge of the load measuring plate by a distance less than the distance over which the lower end portions extend from the outer edge of the load measuring plate, thereby creating oblique measurement planes in the load measuring plate.

2. The combination according to claim 1, wherein the load measuring devices are arranged to measure strain along said measurement planes.

3. The combination according to claim 1, wherein the foot member of the bearing housing comprises attachment holes for receiving bolts adapted to cooperate with holes in the load measuring plate to connect the bearing housing to the load measuring plate and position the bearing housing in a correct relation to the load measuring plate.

4. The combination according to claim 1, wherein the load measuring plate comprises chambers positioned between and extending substantially parallel to the upper and lower surfaces of the load measuring plate, the chambers extending in a direction substantially perpendicular to a longitudinal direction of the load measuring plate.

5. The combination according to claim 1, wherein each of the chambers is comprised of two blind holes with an intermediate wall separating the two blind holes, the load measuring devices being provided on both sides of the intermediate wall in the blind holes.

6. The combination according to claim 5, wherein the intermediate wall is positioned in the measurement plane.

7. The combination according to claim 1, wherein the load measuring devices are strain measurement devices.

8. The combination according to claim 7, wherein the strain measurement devices are strain gauges arranged in a Wheatstone bridge.

9. A bearing housing and load measuring plate combination comprising:
    a load measuring plate provided with at least one load measuring device;
    a bearing housing adapted to rest on a base and comprising a foot member possessing outer wall portions, transverse intermediate wall portions and a planar contact surface adapted to contact and rest upon the load measuring plate;
    the load measuring plate possessing an upper surface and a lower surface, with the upper surface possessing upper end portions positioned in a plane that is offset from a central portion of the upper surface of the load measuring plate, and with the lower surface possessing lower end portions positioned in a plane that is offset relative to a central portion of the lower surface of the load measuring plate;
    the load measuring plate possessing an outer contour and the foot member possessing an outer contour, the outer contour of the load measuring plate being substantially the same as the outer contour of the foot member;
    the foot member of the bearing housing resting on the upper end portions of the load measuring plate, and a lower central portion of the lower surface being adapted to rest on the base with the lower end portions of the lower surface spaced from the base.

10. The combination according to claim 9, wherein the at least one load measuring device is positioned in a chamber formed in the load measuring plate.

11. The combination according to claim 10, wherein the chamber is comprised of two blind holes with an intermediate wall separating the two blind holes, the at least one load measuring device being provided on a side of the intermediate wall in one of the blind holes.

12. The combination according to claim 9, wherein the foot member of the bearing housing comprises attachment holes for receiving bolts adapted to cooperate with holes in the load measuring plate to connect the bearing housing to the load measuring plate.

13. The combination according to claim 9, wherein the load measuring plate comprises chambers positioned between and extending substantially parallel to the upper and lower surfaces of the load measuring plate, the chambers extending in a direction substantially perpendicular to a longitudinal direction of the load measuring plate.

14. The combination according to claim 9, wherein each of the chambers is comprised of two blind holes with an intermediate wall separating the two blind holes, the at least one load measuring device comprising a plurality of load measuring devices each provided on one side of the intermediate wall in one of the blind holes.

15. The combination according to claim 9, wherein the at least one load measuring device is a strain measurement device.

16. The combination according to claim 9, wherein the at least one load measuring device comprises a plurality of load measuring devices.

17. The combination according to claim 16, wherein load measuring devices are strain gauges arranged in a Wheatstone bridge.

* * * * *